G. MUFFLY.
ROTARY INTERNAL COMBUSTION MOTOR.
APPLICATION FILED FEB. 24, 1910.
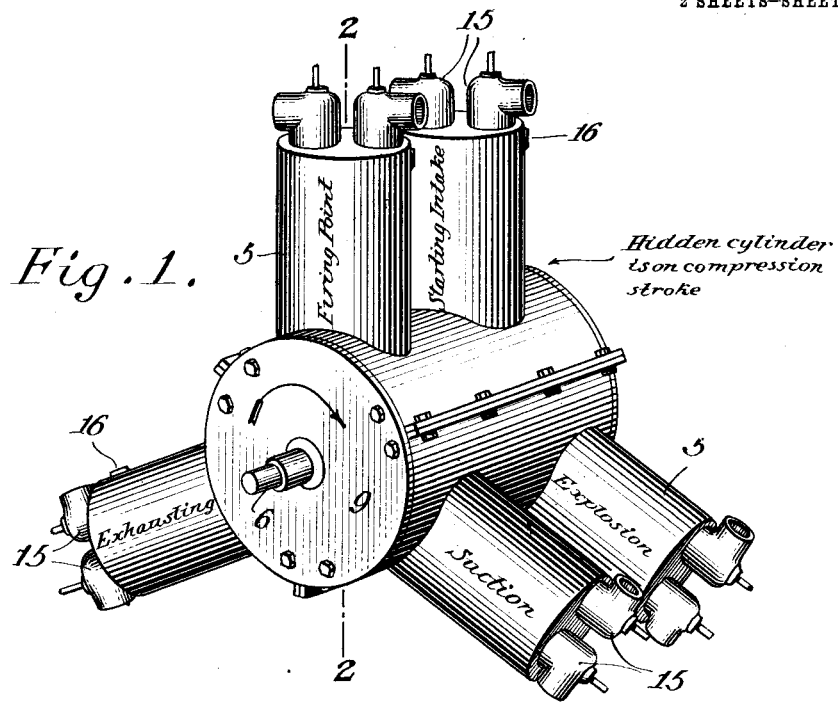
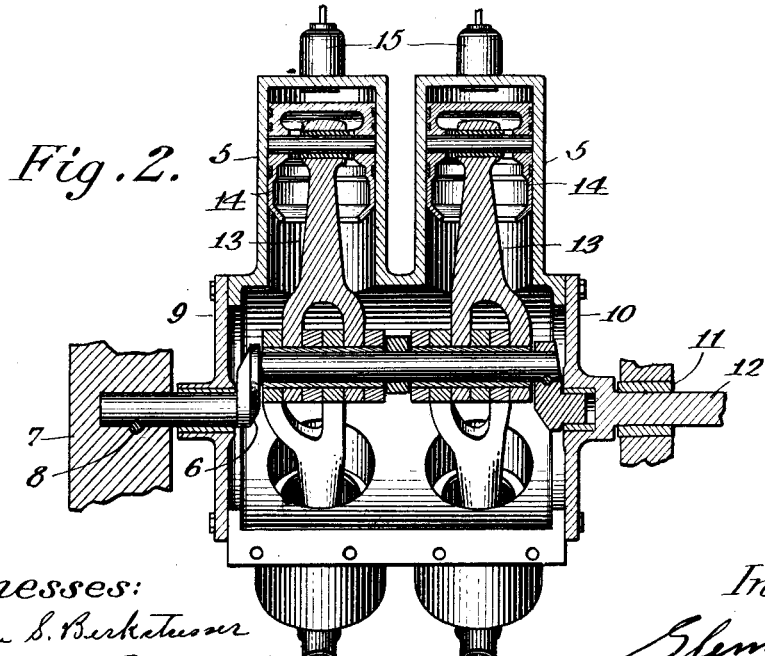

G. MUFFLY.
ROTARY INTERNAL COMBUSTION MOTOR.
APPLICATION FILED FEB. 24, 1910.

1,064,522.

Patented June 10, 1913.

2 SHEETS—SHEET 2.

Witnesses:

Inventor:

UNITED STATES PATENT OFFICE.

GLENN MUFFLY, OF DUBUQUE, IOWA.

ROTARY INTERNAL-COMBUSTION MOTOR.

1,064,522.

Specification of Letters Patent.

Patented June 10, 1913.

Application filed February 24, 1910. Serial No. 545,769.

*To all whom it may concern:*

Be it known that I, GLENN MUFFLY, a citizen of the United States, and a resident of the city of Dubuque, in the county of Dubuque and the State of Iowa, have invented certain new and useful Improvements in Rotary Internal-Combustion Motors, of which I do hereby declare the following to be a full, clear, and exact description.

My invention relates to that class of internal combustion motors in which a plurality of cylinders are arranged to turn about a common axis, and has for its principal object a lighter and more compact construction, which will allow a motor of given cylinder dimensions to revolve in a lesser radius than is required by existing motors of this type.

A further object is to reduce the peripheral velocity of the mass, and so reduce the danger of accidents resulting from the action of centrifugal force.

A still further object is to simplify the valve operating mechanism and the inlet and exhaust manifold pipes by making it possible to combine these parts on two adjacent cylinders moving in parallel planes at the same speed.

Still another object is to provide a revolving internal combustion motor that can readily be mounted upon a horizontal axis, and adapted to use in motor cars or aeroplanes without producing sufficient gyroscopic effect to interfere with the steerage or control of machines so equipped.

With these and other objects in view I have prepared the accompanying drawings which are to be considered a part of this description and wherein similar characters of reference designate similar parts.

I have shown two methods of attaining the desired objects, but it is understood that my invention is not limited to these particular constructions. For instance the crank shaft might be made in a great variety of shapes or be replaced by an eccentric shaft, and the cylinders of the two planes might be set at any angle to each other so long as the pistons, etc. were arranged to perform their functions in proper order and the whole balanced so as to revolve without excessive vibration.

Figure 3:
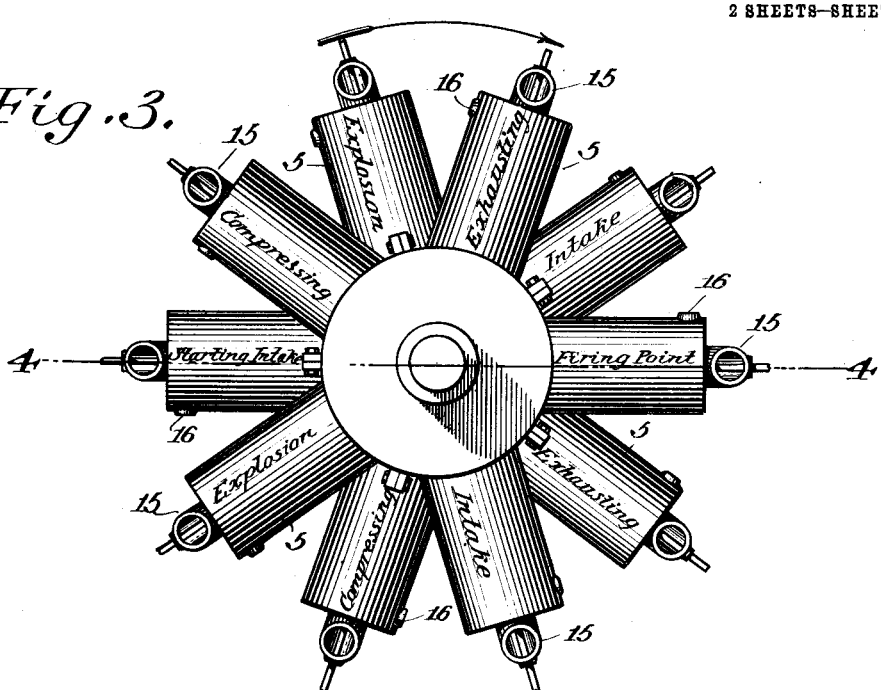
Figure 4:
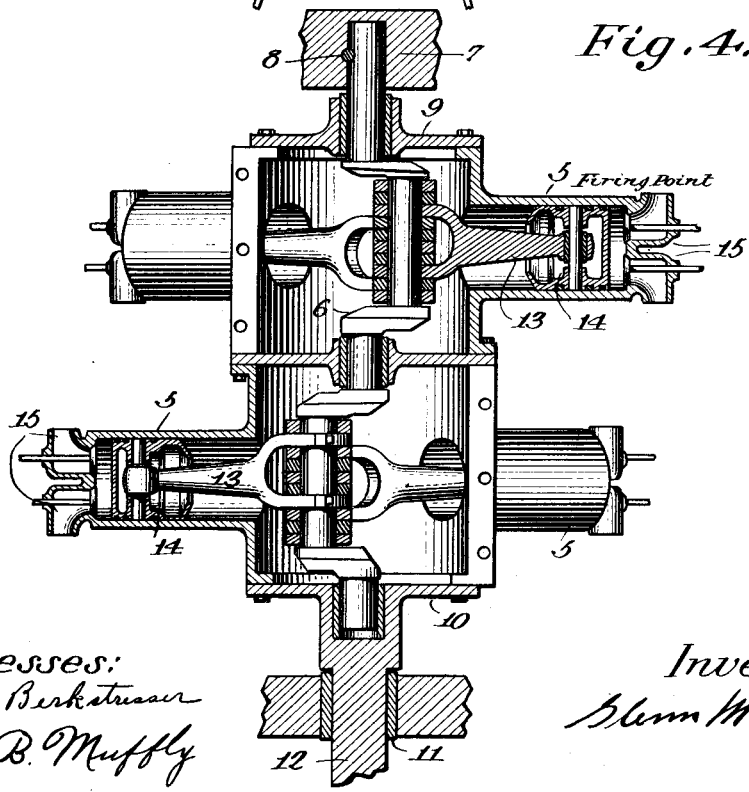

In the drawings, Figure 1 is a perspective view of a six cylinder motor embodying the features of my invention. Fig. 2 is a sectional view on the line 2—2 of Fig. 1, in a plane bisecting the crank-shaft lengthwise. Fig. 3 is an end view of a ten cylinder motor showing a modified form of my invention. Fig. 4 is a sectional view on the line 4—4 of Fig. 3, showing one method of arranging the crank shaft and connecting rods with this cylinder construction.

Referring to the drawings, 5 indicates the cylinders which are attached to or made a part of a cylindrical crank case provided with suitable bearings upon which it revolves about a crank shaft (6) which is either rigidly attached to the supporting frame (7) or allowed to revolve in the opposite direction from the cylinders.

8 is a key holding the shaft (6) in frame or support (7).

9 is a flange or disk forming one end of the crank case and to which the cylinders (5) are securely attached.

10 is a somewhat similar part forming the opposite end of the crank case and driving the shaft (12) over which power is transmitted from the motor.

13 indicates the connecting rods which, as shown, interlock about the crank pins.

14 indicates the pistons which may be of any desirable type, preferably of the trunk pattern.

15 indicates the inlet and exhaust valves which, although here shown to be of the puppet or mushroom type, are no part of this invention and may be of any style.

16 indicates the holes provided for spark plugs which may be of any type suited to the requirements of the motor.

The characteristic feature of my motor is that the cylinders are arranged in two planes or groups, substantially as shown, and the explosions alternate between the two groups in such manner that no two consecutive explosions occur in the same group when the motor is firing properly. It is desirable to have the explosions occur rhythmically: that is, at equal intervals of the motor's revolution, and to this end the crank shaft, valve mechanism and ignition device should be properly designed. Aside from the peculiar cylinder arrangement and order of firing my motor does not differ materially from others in its class. The torque, or turning moment, is produced by the expansion of a charge of explosive mixture, which is ignited at the proper time by electrical or other means and which forces the piston and the cylinder head apart, thereby causing a differential movement between the crank shaft and the cylinders. The force generated in this way can be utilized to turn the crank shaft while the cylinders remain stationary, to turn the cylinders while the crank shaft remains stationary or to turn both the crank shaft and the cylinders in opposite directions. It is to motors operating upon the last two methods that my invention applies, and while primarily intended for motors revolving about horizontal axes it is not limited to this type and is equally applicable to motors revolving about vertical or oblique axes. Upon reference to the drawings it will be seen that with these cylinder arrangements the crank shafts could be made in any of several different shapes and still allow the cylinders to be fired at equal intervals of their revolution.

In order to obtain a uniform application of power and rhythmic order of firing, it is necessary in four cycle explosive motors to either have an odd number of cylinders or have the cranks set at such an angle that two pistons will reach their dead center positions at the same time, one having just completed its compression stroke and the other having just completed its exhaust stroke. Therefore, in a six cylinder motor such as shown in Figs. 1 and 2, the proper firing order could be accomplished with the crank pins set in line, as shown, or set at an angle of 120 degrees to each other. In a ten cylinder motor as shown in Figs. 3 and 4 the cranks could be set at 180 degrees, as shown, at 108 degrees or at 36 degrees angle to each other.

I consider it preferable in four cycle motors to use a number of cylinders divisible by two but not by four, since this simplifies the design, but my invention can also be applied to four cycle motors having an even number of cylinders in each plane or group by making the crank shaft of such a shape that there will be two crank pins for each group of cylinders.

My invention can be used in connection with any even number of cylinders, may be of either the two stroke cycle or four stroke cycle type, and may be operated on any suitable fuel. Two stroke cycle motors would of course require different crank shafts from those herein described in connection with four cycle motors, so that the explosions might be properly spaced, and would preferably be so arranged that no two explosions would occur simultaneously.

In speaking of the cylinders as arranged in planes or groups, it is not to be understood that the cylinders of the same group must necessarily be arranged so that their center lines are exactly in the same plane. It may be found best to have the cylinders of the same group staggered or offset somewhat in order to facilitate attachment of the connecting rods to the crank shaft, or to prevent the various pistons from interfering with one another when in that part of their orbit nearest the axis about which the cylinders revolve.

The drawings do not show the valve operating mechanism, the inlet and exhaust connections, or the ignition device, but it is understood that these may be of any suitable design.

It is further understood that my invention is not limited to automobile and aeronautic use, but is applicable in all cases where there is use for gasolene, gas, oil, vapor, hydro-carbon, alcohol, kerosene, naphtha or other types of internal combustion or explosive engines or motors.

What I claim as my invention, and wish to secure by Letters Patent, is:

1. A rotary internal combustion motor with cylinders arranged radially about a common axis in two or more planes or groups, pistons acting within said cylinders and the whole so timed that the explosions will occur in rotation between the various planes or groups of cylinders.

2. A rotary internal combustion motor having an even number of cylinders arranged radially about a common axis in two planes or groups, pistons acting within said cylinders, and means being provided for supplying an explosive mixture and firing same within the cylinders of the two planes or groups alternately in such manner that no two consecutive explosions shall occur in the same group of cylinders.

3. A gas engine of the revolving cylinder type with cylinders arranged in two star-shaped groups, rigidly connected and rotating in separate planes about the same axis, said cylinders being provided with pistons connected with a suitable crank shaft or eccentric device, inlet and exhaust ports, ignition device and all necessary mechanism, the whole being so timed that the explosions will alternate between the two groups of cylinders and occur at equal intervals in the revolution of the cylinders.

GLENN MUFFLY.

Witnesses:
CHAS. FALKENHAINE,
WM. T. POTTERWELD.

Copies of this patent may be obtained for five cents each, by addressing the "Commissioner of Patents, Washington, D. C."